United States Patent [19]

Scott

[11] 4,066,343

[45] Jan. 3, 1978

[54] CONFIGURATION CONTROL APPARATUS

[75] Inventor: Roderic M. Scott, Stamford, Conn.

[73] Assignee: The Perkin-Elmer Corporation, Norwalk, Conn.

[21] Appl. No.: 677,219

[22] Filed: Apr. 15, 1976

[51] Int. Cl.[2] .......... G02B 5/10

[52] U.S. Cl. .......... 350/295; 343/915

[58] Field of Search .......... 350/295; 343/915

[56] References Cited

U.S. PATENT DOCUMENTS

| | | | |
|---|---|---|---|
| 1,910,119 | 5/1933 | Moats | 350/295 |
| 3,291,020 | 12/1966 | Friedel | 350/295 UX |

*Primary Examiner*—F. L. Evans

*Attorney, Agent, or Firm*—S. A. Giarratana; F. L. Masselle

[57] ABSTRACT

Equal and opposite moments are applied to distort a specimen in varying the configuration thereof so that transfer of reaction forces into the specimen's supporting structure is avoided. Specific embodiments where the specimen is a mirror in an optical system are disclosed.

6 Claims, 6 Drawing Figures

CONFIGURATION CONTROL APPARATUS

BACKGROUND OF THE INVENTION

The present invention relates to configuration control apparatus for applying moments to distort a specimen and particularly the application of such apparatus to optical elements. Variation of specimen configuration is generally important to many fields such as antennae in communications and reflective elements in optical systems. Although specimen configuration control apparatus has been developed in some fields, all such apparatus distort the specimen by applying forces normal to the surface with reaction forces being transferred through the supporting structure thereof.

SUMMARY OF THE INVENTION

It is the general object of this invention to control the configuration of a specimen by applying equal and opposite moments thereto.

It is a specific object of this invention to control the surface contour of an optical element therewith.

These objects are accomplished according to the present invention by extending posts perpendicularly from the surface of the specimen and disposing force producing actuators thereacross between the posts to apply equal and opposite moments therein. Otherwise, the number and arrangement of both the posts and the force actuators depend on the distortion that is required in the specimen to attain the desired configuration thereof.

BRIEF DESCRIPTION OF THE DRAWINGS

The manner in which these and other objects of the present invention are achieved will be best understood by reference to the following description, the appended claims, and the attached drawings wherein:

DESCRIPTION OF THE PREFERRED EMBODIMENTS

Although the configuration control apparatus of this invention could be applied to specimens having any configuration, for the sake of simplified discussion only embodiments thereof as applied to flat disc configurations will be disclosed. In all embodiments of this invention however, posts are extended perpendicularly from the specimen for which configuration is being controlled. Otherwise, force producing actuators are disposed across the specimen between the posts, so that equal and opposite moments result within the specimen from each actuator. Of course, the posts are located on the specimen in accordance with the distortion thereof that is required to attain the desired configuration and the particular application determines such configuration. Otherwise, the number of actuators also depends on the particular application in that a single actuator could be utilized for single mode distortion whereas multiple actuators would be utilized for multiple mode distortion.

Figure 1:
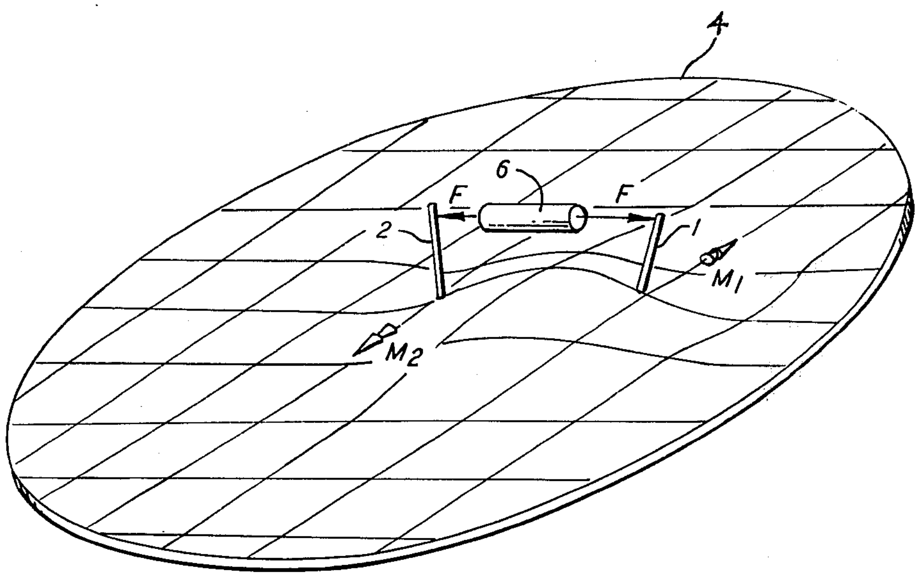
FIG. 1 illustrates a simplified embodiment of this invention wherein equal and opposite moments result from a single force actuator within a specimen having a flat disc configuration.

Equal and opposite moments are developed within the specimen for each actuator utilized in the embodiments of this invention as is illustrated in FIG. 1 where two posts 1 and 2 extend from a disc 4 and a force producing actuator 6 is disposed thereacross between the posts 1 and 2. These moments are designated as $M_1$ at post 1 and $M_2$ at post 2, with the configuration of the disc 4 being shown as distorted thereby. Of course, the character of the distortion depends on the exact location of the posts 1 and 2 relative to the center of the disc 4 and although complex, analysis of disc distortion is well known to those skilled in the art. An authority on the subject is S. Timoshenko's book THEORY OF PLATES AND SHELLS, published by McGraw Hill in 1959. Furthermore, the complexities of such analysis is considerably reduced through the use of computers and analysis of distortion for configurations other than discs are also well known to artisans.

Figure 2A:
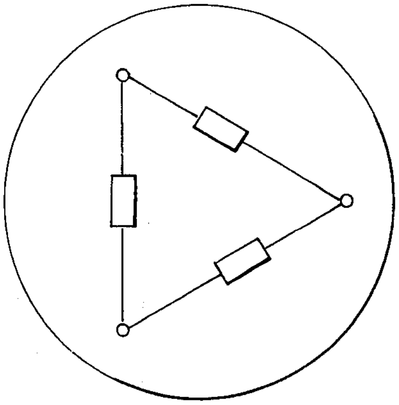
FIGS. 2A–2E illustrate other embodiments of this invention wherein a plurality of force actuators are arranged to distort an optical element.
Figure 2B:
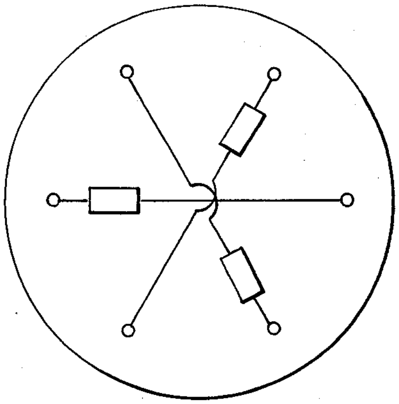
Figure 2C:
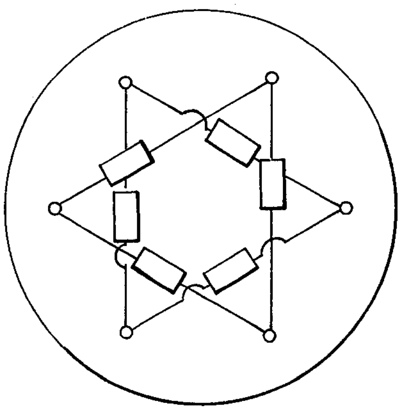
Figure 2D:
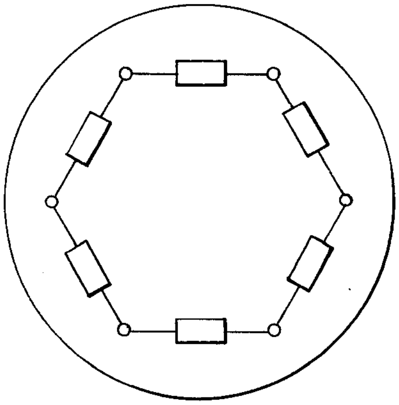
Figure 2E:
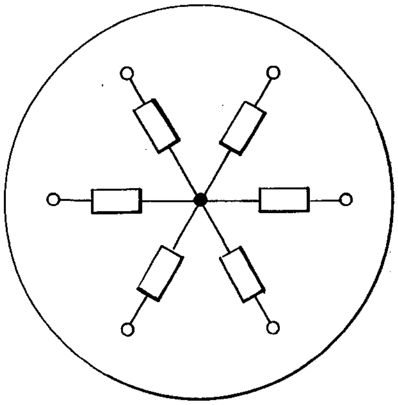

The flat disc configuration of the specimen was selected for discussing the configuration control apparatus of this invention because it is fundamental to so many applications thereof. One such application is to distort a mirror element within an optical system to vary the contour of its reflective surface and some actuator arrangements for this application are illustrated in FIGS. 2A–2E. The number of actuators and posts required to provide a particular correction depends on the complexity of that correction. For simple correction such as curvature or astigmatism, three actuators between three posts suffice as shown in FIG. 2A. For higher order corrections, more actuators are required and three typical arrangements of actuators for six posts are shown in FIGS. 2B, 2C, and 2D. Furthermore, the same configuration control precision could be derived with six force actuators arranged as shown in FIG. 2E where a seventh post is disposed at the center of the disc configuration.

Those skilled in the art will understand that the present disclosure has been made by way of example and that numerous changes in the details of construction and the combination or arrangement of parts may be resorted to without departing from the true spirit and scope of this invention. Therefore, the present disclosure should be construed as illustrative rather than limiting.

What I claim is:

1. Apparatus for controlled multiple mode distortion of an electromagnetic radiation element, comprising:
   - at least three posts affixed to the electromagnetic radiation element and extending therefrom; and
   - actuators disposed between said posts for applying variable force therebetween, equal and opposite moments being developed from the force of each said actuator through said posts to distort the electromagnetic radiation element, said posts being located on the electromagnetic radiation element to provide at least two modes of distortion therein.

2. The apparatus of claim 1 wherein the electromagnetic radiation element is an optical element having a reflective surface and the multiple mode distortion thereof is controlled to vary the contour of said reflective surface.

3. The apparatus of claim 2 wherein said optical element is in the configuration of a disc with three posts and three actuators symmetrically arranged thereon about the center thereof, the forces applied by said actuators being equal when controlling the focus of said optical element and unequal when controlling the astigmatism.

4. The apparatus of claim 2 wherein said optical element is in the configuration of a disc with six posts symmetrically arranged thereon about the center thereof and with three actuators arranged thereacross through the center thereof, the forces applied by said actuators being equal when controlling the focus of said optical element and unequal when controlling the astigmatism.

5. The apparatus of claim 2 wherein said optical element is in the configuration of a disc with six posts and six actuators symmetrically arranged thereon about the center thereof, the forces applied by said actuators being equal when controlling the focus of said optical element and unequal when controlling the astigmatism.

6. The apparatus of claim 2 wherein said optical element is in the configuration of a disc with six posts symmetrically arranged thereon about a seventh post at the center thereof and six actuators are disposed across the disc between said seventh post and each of said other posts, the forces applied by said actuators being equal when controlling the focus of said optical element and unequal when controlling the astigmatism.

* * * * *